US010214362B2

(12) United States Patent
Farley et al.

(10) Patent No.: US 10,214,362 B2
(45) Date of Patent: Feb. 26, 2019

(54) GRAIN UNLOADING SYSTEM

(75) Inventors: Herbert M. Farley, Elizabethtown, PA (US); Denver R. Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 845 days.

(21) Appl. No.: 13/402,347

(22) Filed: Feb. 22, 2012

(65) Prior Publication Data
US 2012/0269607 A1  Oct. 25, 2012

(51) Int. Cl.
*B65G 33/14* (2006.01)
*A01D 41/12* (2006.01)

(52) U.S. Cl.
CPC ......... *B65G 33/14* (2013.01); *A01D 41/1217* (2013.01)

(58) Field of Classification Search
CPC .... B65G 47/5131; B65G 21/18; B65G 47/52; B65G 15/14; B65G 17/26; B65G 15/105; B65G 15/02; B65G 37/00; B65G 33/32; B65G 67/606; B65G 33/00; B65G 25/065; B65G 65/4827; B65G 65/44; B65G 65/46; B65G 65/42; B65G 67/24; B65G 65/00; B65G 65/463; B23P 21/004; A01D 87/125; A01D 61/008; A01D 41/1217; A01D 90/08; B60P 1/36; B60P 1/42; B60P 1/40; B65F 3/202; B65F 3/22; A01C 3/06; A01F 25/2018
USPC ........ 198/602, 606, 608; 414/502, 503, 507, 414/526, 528, 325, 326, 327, 310
See application file for complete search history.

(56) References Cited

U.S. PATENT DOCUMENTS

| | | | |
|---|---|---|---|
| 767,762 A | 8/1904 | McClelland | |
| 2,075,352 A * | 3/1937 | Lower | 198/577 |
| 2,103,212 A * | 12/1937 | Turner et al. | 198/589 |
| 2,119,071 A * | 5/1938 | Capps | 198/577 |
| 2,233,085 A * | 2/1941 | Schweickart et al. | 198/579 |
| 2,237,428 A * | 4/1941 | Hanna | 241/276 |

(Continued)

FOREIGN PATENT DOCUMENTS

| | | |
|---|---|---|
| AT | 365401 B | 1/1982 |
| GB | 1086037 A | 10/1967 |

(Continued)

*Primary Examiner* — Glenn F Myers
(74) *Attorney, Agent, or Firm* — Peter K. Zacharias; Patrick M. Sheldrake

(57) ABSTRACT

An agricultural device for unloading of grain including an unloader conveyor includes a first enclosed housing having an inlet end including an opening for receiving grain. A second enclosed housing having an opposite outlet end includes a discharge opening through which the grain can be discharged. An unloader conveyor element extends through the housing between the ends and is operable for conveying the grain through the housing from the inlet end and discharging the grain through the discharge opening. The unloader conveyor element has a first unloader conveyor segment in operative association with a second unloader conveyor segment downstream of the first unloader conveyor segment. A directional transition region is positioned between the first unloader conveyor segment and the second unloader conveyor segment. At least a portion of the second housing near the directional transition region includes a region having reduced cross-sectional area.

10 Claims, 4 Drawing Sheets

(56) References Cited

U.S. PATENT DOCUMENTS

| | | | | |
|---|---|---|---|---|
| 2,266,650 A * | 12/1941 | Matheis | | 198/668 |
| 2,676,721 A * | 4/1954 | Hansen | | 414/502 |
| 2,977,873 A | 4/1961 | Crane et al. | | |
| 3,133,727 A * | 5/1964 | Luscombe | | B01F 13/0035 198/312 |
| 3,251,467 A * | 5/1966 | Bakke | | B07B 1/20 198/661 |
| 3,580,384 A * | 5/1971 | Pingree | | 198/550.1 |
| 3,872,982 A * | 3/1975 | Rowland-Hill et al. | | 414/326 |
| 4,093,087 A * | 6/1978 | DeCoene | | A01D 41/1217 198/668 |
| 4,269,200 A | 5/1981 | Gorsler | | |
| 4,274,786 A | 6/1981 | Svensson et al. | | |
| 4,289,439 A | 9/1981 | Hansson | | |
| 4,386,695 A | 6/1983 | Olson | | |
| 4,408,947 A * | 10/1983 | Lenski | | A01D 41/1208 198/608 |
| 4,881,862 A | 11/1989 | Dick | | |
| 5,108,249 A * | 4/1992 | Kinzenbaw et al. | | 414/523 |
| 5,184,715 A * | 2/1993 | Feterl | | 198/667 |
| 5,573,660 A | 11/1996 | Eicker et al. | | |
| 5,615,989 A | 4/1997 | Matousek et al. | | |
| 5,735,386 A * | 4/1998 | Epp et al. | | 198/550.01 |
| 5,906,471 A * | 5/1999 | Schwoerer | | B65G 33/32 222/413 |
| 6,042,326 A * | 3/2000 | Thomas et al. | | 414/502 |
| 6,053,811 A | 4/2000 | Johnson et al. | | |
| 6,053,881 A | 4/2000 | Johnson et al. | | |
| 6,125,618 A | 10/2000 | Dillon | | |
| 6,350,197 B1 | 2/2002 | Cooksey et al. | | |
| 7,040,980 B1 * | 5/2006 | Kestel | | 460/114 |
| 2006/0072989 A1 * | 4/2006 | Kaeb et al. | | 414/310 |
| 2006/0104770 A1 * | 5/2006 | Talbi et al. | | 414/526 |
| 2009/0311080 A1 * | 12/2009 | Hilsabeck et al. | | 414/310 |

FOREIGN PATENT DOCUMENTS

| | | |
|---|---|---|
| JP | 01197230 A | 8/1989 |
| WO | 9948352 A1 | 9/1999 |

\* cited by examiner

GRAIN UNLOADING SYSTEM

CROSS-REFERENCE TO RELATED APPLICATIONS

This application claims the benefit of U.S. Provisional Application No. 61/517,420, entitled "AUGER INLET TRANSITION GEOMETRY," filed Apr. 19, 2011, which application is hereby incorporated by reference in its entirety.

FIELD OF THE INVENTION

The present invention generally relates to unloading systems for agricultural devices and, more particularly, to grain unloading systems for agricultural devices.

BACKGROUND

Grain tanks of combines commonly have an associated unloader conveyor operable for conveying grain from the grain tank to another location such as to a grain truck or wagon. An unloader conveyor typically includes an elongate, enclosed tubular housing containing a helical auger and is oriented horizontally or at a small acute angle to horizontal. The unloader conveyor is typically pivotally supported in cantilever relation by a lower end of an upstanding or vertical lower unloader conveyor or auger section including an inlet opening disposed in or adjacent to the grain tank. The unloader conveyor is typically pivotable between a stored position extending along the combine, and a sidewardly extending unloading position. The unloader can be of any length, but will typically have a length sufficient to extend just beyond the end of a header of the combine. Grain tanks additionally typically include at least one grain tank conveyor including an auger adjacent to the bottom of the grain tank and extending into the inlet opening of the lower unloader conveyor or auger for conveying grain into the unloader.

The unloader conveyor requires a significant amount of power to operate, with power requirements foreseeably increasing, especially in light of the demand for ever-increasing grain delivery rates by the combine.

Thus, what is sought is a grain unloader system which permits comparable or increased grain delivery rates while simultaneously reducing the amount of power required to operate the system.

SUMMARY OF THE INVENTION

Other features and advantages of the present invention will be apparent from the following more detailed description of the preferred embodiment, taken in conjunction with the accompanying drawings which illustrate, by way of example, the principles of the invention.

The present invention relates to an agricultural device for unloading of grain including an unloader conveyor including a first enclosed housing having an inlet end including an opening for receiving grain. A second enclosed housing having an opposite outlet end includes a discharge opening through which the grain can be discharged. An unloader conveyor element extends through the housing between the ends and is operable for conveying the grain through the housing from the inlet end and discharging the grain through the discharge opening. The unloader conveyor element has a first unloader conveyor segment in operative association with a second unloader conveyor segment downstream of the first unloader conveyor segment. A directional transition region is positioned between the first unloader conveyor segment and the second unloader conveyor segment. At least a portion of the second housing near the directional transition region includes a region having reduced cross-sectional area.

An advantage of the present invention is a grain unloading system that is configured to operate using less power than current unloading systems.

Numerous other features and advantages of the present invention will become readily apparent from the following detailed description, the accompanying drawings, and the appended claims.

DETAILED DESCRIPTION OF THE PREFERRED EMBODIMENTS

Figure 1:
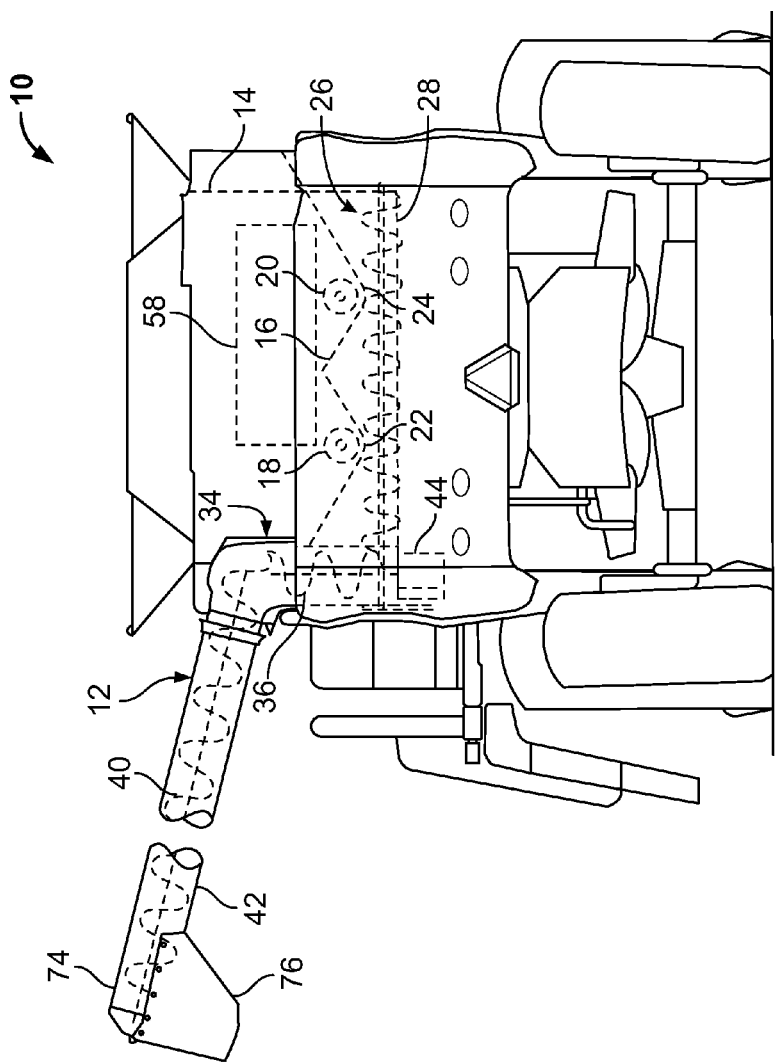
FIG. 1 is a simplified rear view of a representative agricultural harvesting device, including an unloading system according to the invention for unloading grain from a grain holding vessel of the device.

Referring now the drawings, in FIG. 1, a representative agricultural harvesting machine or agricultural device 10 is shown, including an unloader or unloader conveyer 12 operable for unloading agricultural grain from a grain tank located on an upper region of harvesting machine or agricultural device 10. Here, harvesting machine or agricultural device 10 is depicted as a well known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system of machine or device 10 by a clean grain conveyor to a grain elevator (not shown). The grain elevator then lifts the grain upwardly to a grain delivery conveyor which is operable for discharging the grain into a vessel or grain tank 14 onto a floor 16 thereof. When vessel or grain tank 14 is filled with grain, or filled to a desired level, unloader or unloader conveyor 12 can be operated for unloading the grain from vessel or grain tank 14, onto the ground, or into a wagon, truck or other vehicle, or a bin or the like.

It is to be understood that agricultural device 10 may include a harvester, such as a combine, or may include a fixed vessel for temporarily holding grain. However in another embodiment the agricultural device may be mobile, such as a wagon that is configured for driven movement between a first location and a second location, and alternately, may include a device that is self-propelled.

Figure 2:
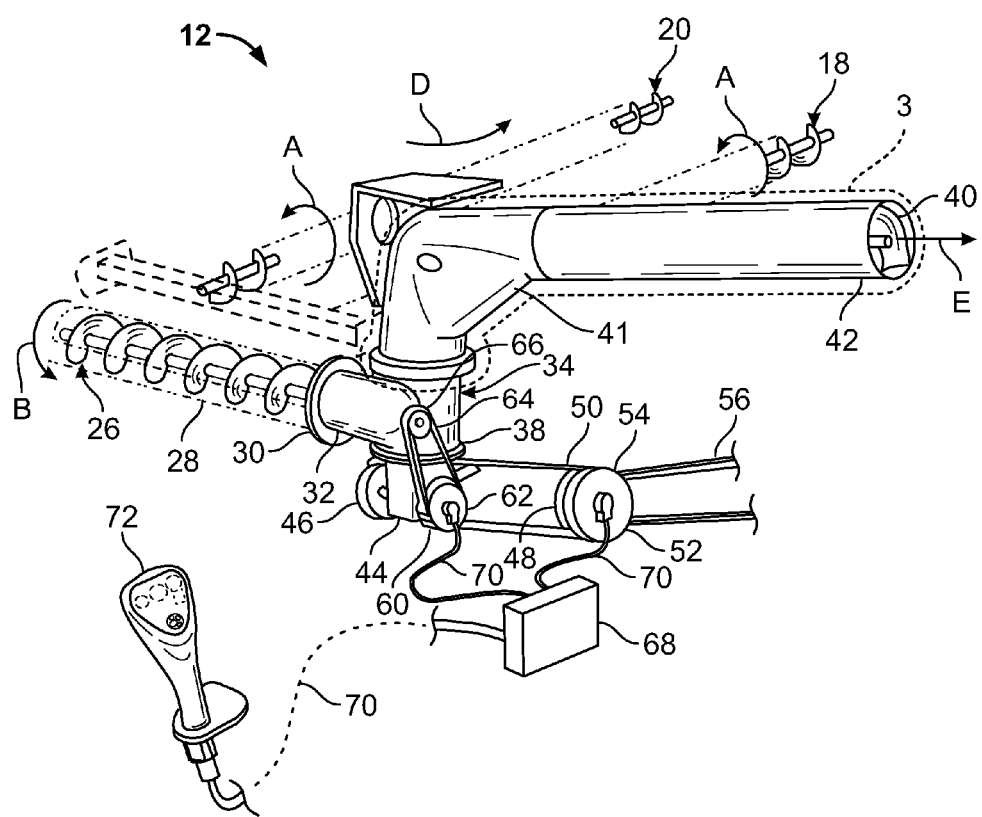
FIG. 2 is a simplified partial perspective view of the unloading system of FIG. 1.

Referring also to FIG. 2, vessel or grain tank 14 may include a pair of grain tank conveyors 18 and 20 disposed in forward and rearwardly extending troughs 22 and 24 in floor 16 (FIG. 1). Grain tank conveyors 18 and 20 are each a generally horizontal elongate helical auger rotatable in a direction denoted by arrows A in FIG. 2 for instance, by being directly coupled, through a set of gearbox assemblies (not shown), to a main grain tank conveyer 26, or by a suitable drive or drives such as a belt, chain and/or shaft drive or a fluid or electric motor (not shown) for conveying grain through the respective trough 22 or 24 to a main grain tank conveyor 26. Main grain tank conveyor 26 comprises another generally horizontal elongate helical auger, located in a side to side extending trough 28 at the forward end of troughs 22 and 24 and vessel or grain tank 14. Here, it should be noted that the configuration of vessel or grain tank 14 shown is intended to be representative of a wide variety of grain tank configurations, and a grain tank can be configured differently, for instance, so as to have a floor which slopes down to directly to one or more main conveyors 26 (not shown) which feed to the unloader, thereby eliminating conveyors 18 and 20. It is to be understood that additional disclosure may be contained in Applicant's U.S. Pat. No. 7,452,180 titled Grain Tank Unloader And Clean Out Control, which is hereby incorporated by reference in its entirety. It is also to be understood that the present disclosure is not limited to a harvester, and could be incorporated into an agricultural device, such as a vessel (not shown) configured to contain or temporarily store grain therein, such as a silo. Additionally/alternately, the vessel (not shown) may be portable, for example, a wagon that may be pulled behind another device, such as a tractor, or configured for driven movement from a first location toward a second location, such as by a motorized grain wagon (not shown).

Figure 3:
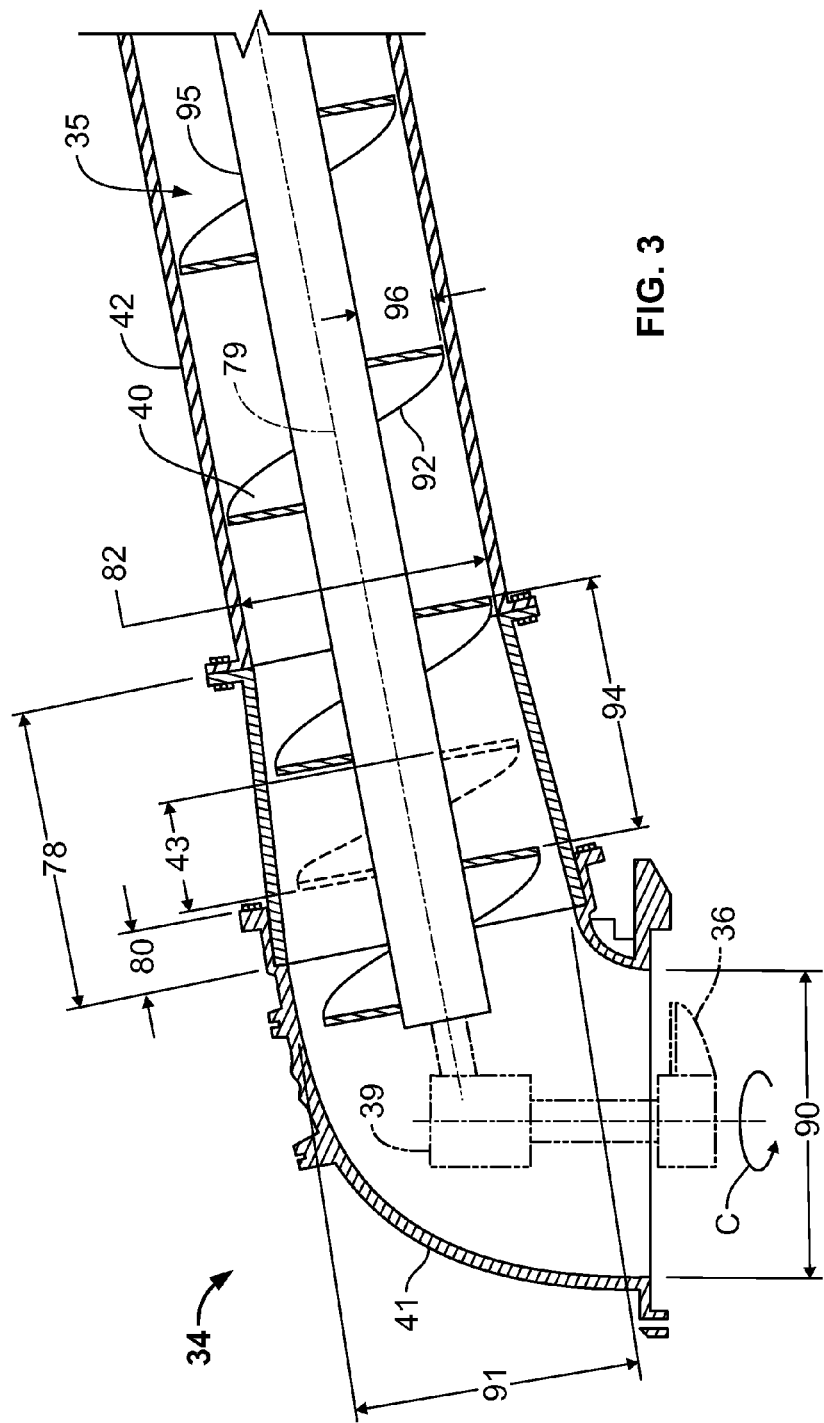
FIG. 3 is a cross-section taken from region 3 of FIG. 2 of the unloading system of FIG. 1.
Figure 4:
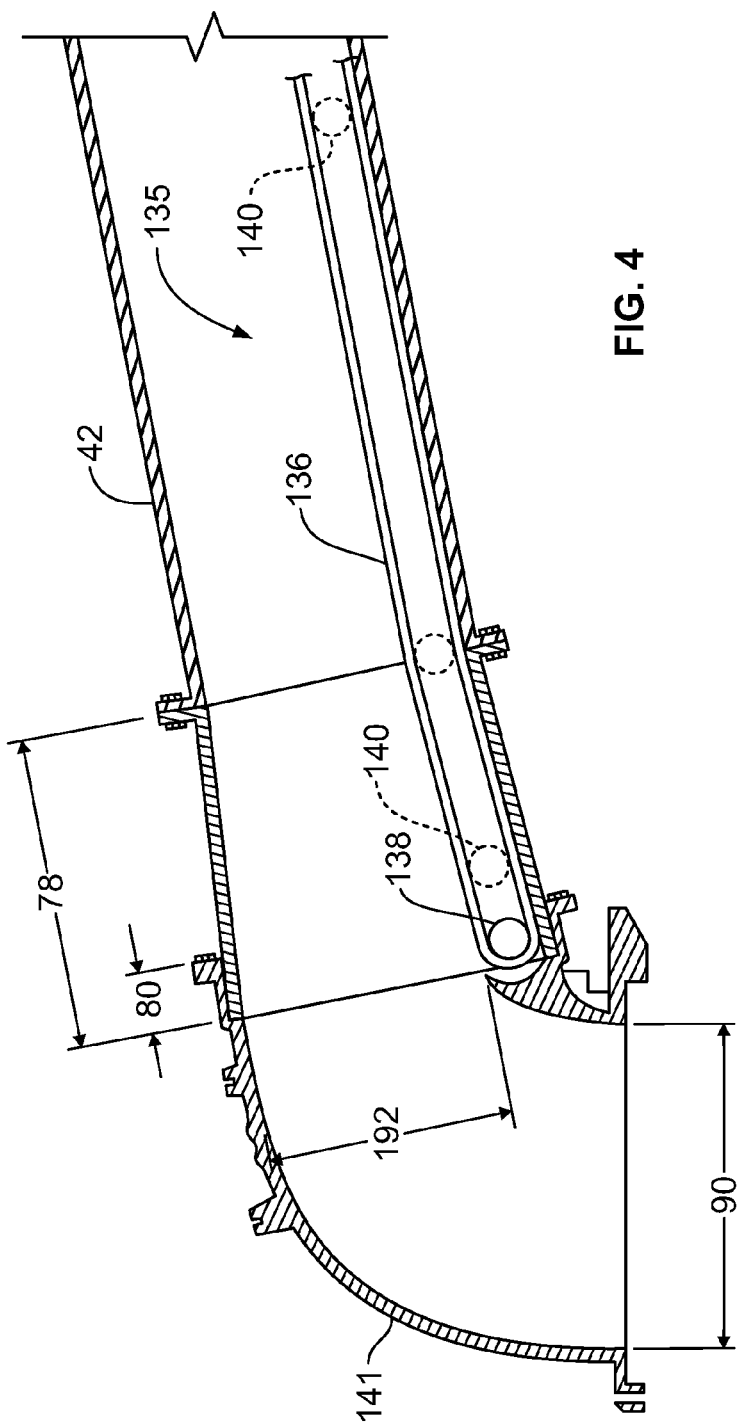
FIG. 4 is a cross-section taken from region 3 of FIG. 2 of an alternate embodiment of the unloading system of FIG. 1.

Referring also to FIGS. 2-3, main grain tank conveyor 26 is rotatable in a direction denoted by arrow B (FIG. 2) for conveying the grain from conveyors 18 and 20 along trough 28 into an inlet opening 30 in an inlet end 32 of an unloader conveyor element 35 (FIG. 3), which unloader conveyor element 35 includes an unloader conveyor segment 36 of unloader conveyor 34 of unloader or unloader conveyor 12. As shown in FIG. 3, unloader conveyor element 35 of unloader conveyor 34 also includes a second unloader conveyor segment 40 to convey grain toward discharge opening 76. In an alternate embodiment, as shown in FIG. 4, an unloader conveyor element 135 may include at least one belt, such as a continuous belt 136 supported at one end by a primary roller 138 and supported intermediate the opposed primary roller (not shown) by secondary rollers 140. In yet a further embodiment, a portion of the belt may be supported by the unloader conveyor 34, such as by an inner surface of tubular second housing 42 (FIG. 4), with idler rollers secured exterior of tubular second housing 42 of the unloader conveyor at opposed ends of the continuous belt. In other words, the unloader conveyor element may include one or more augers/belts, as desired, or as appropriate for the application.

As shown in FIGS. 1-2, unloader conveyor 34 includes an elongate upwardly or generally vertically extending auger or conveyor or conveyor segment or first conveyor segment 36 supported for rotation as denoted by arrow C (FIG. 3) in a first substantially enclosed housing 38, such as an upwardly extending tubular housing, and an elongate auger or conveyor or second unloader conveyor segment 40 oriented horizontally or at a small acute angle to horizontal, supported for rotation in an elongate second substantially enclosed housing 42, such as a tubular housing. Positioned between tubular housings 38, 42 is a directional transition region 41, such as an elbow, connected to and forming a continuation of housings 38, 42. Second housing 42, directional transition region 41 and an upper portion of first housing 38 are supported in cantilever relation by a lower portion of first housing 38 and top of directional transition region 41 for rotation relative thereto, as denoted by arrow D in FIG. 2, between an unloading position as shown, and a rearwardly extending stored position at about a 90 degree angle to the unloading position, in the well known manner.

Auger or conveyor or conveyor segment or second unloader conveyor segment 40 is connected to or otherwise operatively associated with auger or conveyor or conveyor segment or first conveyor segment 36 for rotation thereby in a suitable manner, such as by a gearbox 39 including bevel gears, a Hooke's joint, or the like, also in the well known manner. Auger or conveyor or first conveyor segment 36 is connected in rotatably driven relation to an output of an unloader drive 44, which can include, for instance, a right angle gear drive (not shown) having an input pulley 46 connected in rotatably driven relation to a pulley 48 by a belt 50. Pulley 48 is connected to an output of an unloader drive clutch 52 having an input pulley 54 which is driven by a belt 56 which, in turn, is rotated by an output of an engine 58 (FIG. 1) of agricultural device 10 or another rotatable power source, in the well known conventional manner. Unloader drive clutch 52 can be, for instance, a well known commercially available fluid or electrically actuated clutch controllable in the well known manner by a solenoid or the like (not shown). Here, unloader drive 44 additionally includes a second output rotatably drivingly connected to an input of a device 60 which includes an output pulley 62 connected by a belt 64 to a pulley 66 connected to main grain tank conveyor 26. Device 60 is selectably operable for connecting drive 44 in rotatably driving relation to belt 64 for drivingly rotating main grain tank conveyor 26. Device 60 can be, for instance, another well known commercially available fluid or electrically actuated clutch conventionally controllable by a solenoid or the like. As alternatives, it should be understood that it is contemplated that main grain tank conveyor 26 and unloader conveyor 34 can be individually selectably driven, using one or more other drives, including, but not limited to, electric or fluid motors, or belt, chain and/or shaft drives or the like, as desired or required for a particular application, it only being required for the present control that conveyors 26 and 34 be individually or separately controllable.

Unloader or unloader conveyor 12 additionally includes an unloader controller 68 which can be, for instance, a well known commercially available processor based controller and/or a fluid based controller connected in operably controlling relation to clutch 52 and device 60, by, for instance, one or more conductive paths as represented by lines 70. Controller 68, in turn, can be operably connected to one or more input devices 72 in a suitable manner such as by one or more conductive paths represented by another line 70, for receiving inputs or input commands therefrom, also in the well known manner. As a non-limiting example, input device 72 can be a switch such as a momentary rocker switch movable to positions including an unloading position and a clean out position, a touch screen, or the like, located in an operator cab of agricultural device 10 or elsewhere.

Generally, in operation, grain tank conveyors 18 and 20 will convey grain in vessel or grain tank 14 to main grain tank conveyor 26, which will convey the grain into inlet opening 30 in inlet end 32 of unloader conveyor 34. Operation of unloader conveyor 34 will convey the grain upwardly and through first housing 38, through directional transition region 41 and then through second housing 42 as denoted by arrow E in FIG. 2 to a free end or outlet end 74 thereof (FIG. 1) where the grain will be discharged from the conveyor through a discharge or outlet opening 76. The grain can be discharged into any receptacle such as a wagon or truck, or onto the ground or another surface or location (not shown), as desired.

Referring now to FIGS. 2-3, an exemplary embodiment of unloader conveyor 34 includes second housing 42 having a region 78 of reduced cross-sectional area. As further shown in FIG. 3, region 78 is positioned near directional transition region 41. In one embodiment, region 78 of reduced cross-sectional area is substantially continuous. Stated another way, the cross-sectional area of region 78, as measured along a plane that is perpendicular to axis 79 decreases in a substantially continuous manner proceeding along an axis 79 from directional transition region 41 toward second housing 42. However, in another embodiment, region 78 of reduced cross-sectional area may be discontinuous. That is, the cross-sectional area of region 78, as measured along a plane that is perpendicular to axis 79 decreases in a discontinuous manner, i.e., portions of the cross-sectional area of region 78 may remain constant, or may include an increase in cross-sectional area proceeding along an axis 79 from directional transition region 41 toward second housing 42. Inclusion of region 78 has resulted in a significant reduction in power, while providing the same grain conveyance rates. For example, use of a region of reduced cross-sectional area from 17 inches in diameter (227 square inches) to 15 inches in diameter (177 square inches) in combination with existing augers normally associated with 15 inch diameter and 17 inch diameter tubes, realized a reduction of power.

As shown in FIG. 3, cross-sectional area 91 of region 78 that is in contact with directional transition region 41 is larger than a cross-sectional area 82 positioned at the opposite end of region 78, which cross-sectional area 82 is associated with the interface between the portion of second housing 42 downstream of region 78. In one embodiment, the cross-sectional area associated with second housing 42 is substantially constant, although in another embodiment, cross-sectional area associated with second housing 42 may vary. For example, the cross-sectional area associated with second housing 42 preceding in a direction along axis 79 away from region 78 may continue to decrease along substantially the entire length of second housing 42.

In a further embodiment, at least a portion of region 78 of reduced cross-sectional area may define a curved profile, which curved profile may include portions of continuously or discontinuously decreasing cross-sectional area proceeding along an axis 79 from directional transition region 41 toward second housing 42. In yet a further embodiment, at least a portion of region 78 of reduced cross-sectional area defines a cone. In still yet a further embodiment, at least a portion of region 78 of reduced cross-sectional area defines a conic section or conical profile. In a further embodiment, the conic section is a regular conic section or conical profile. As further shown in FIGS. 2-3, region 78 includes an overlap 80 between the interface of region 78 and directional transition region 41. A cross-sectional area 90 associated with an inlet of directional transition region 41 may be substantially equal to cross-sectional area 91 associated with an outlet of directional transition region 41, which outlet is also the interface between region 78 and directional transition region 41.

FIG. 4 is an alternate embodiment of unloader conveyor element 135, which includes at least one belt 136 supported by a primary roller 138 at one end (the other end not shown in FIG. 4). Belts 136 may be incrementally supported along its length by secondary rollers 140. In this embodiment, directional transition 141 includes cross-sectional area 90 associated with an inlet of directional transition 141. However, cross-sectional area 192 associated with an outlet of directional transition 141 may be less than cross-sectional area 90, in order for the grain to "clear" or otherwise provide a smooth flow transition with belt 136. In a further embodiment, cross-sectional area 192 may be substantially equal to cross-sectional area 90.

Further referring to FIGS. 2-3, unloader conveyor element 35 includes first conveyor segment 36 and second unloader conveyor segment 40 having auger flights 92 for conveying grain between inlet end 32 and outlet end 74 in FIG. 1. In one embodiment, at least a portion of second unloader conveyor segment 40, such as an auger flight 92 of second unloader conveyor segment 40 extends at least partially into directional transition region 41. In another embodiment, an auger flight 92 extends in close proximity to directional transition region 41, but does not extend into the directional transition region. In a further embodiment, multiple auger flights 92 extend into directional transition region 41. In another embodiment, as shown in FIG. 3, up to about one auger flight 94 extends into directional transition region 41.

In another embodiment, in which at least a portion of an auger flight 92 extends in close proximity to the directional transition region 41, a variation may be formed in an auger flight taper 96. That is, for example, there may be a difference in the outwardly extending distance auger 92 extends away from a shaft 95 of second unloader conveyor segment 40. In a further embodiment in which at least a portion of an auger flight 92 extends into directional transition region 41, a variation may be formed in auger flight taper 96 as discussed above. It is to be understood that in different embodiments, the variation of auger taper may result in an increasing auger taper, a decreasing auger taper, or combination thereof.

In another embodiment, in which at least a portion of an auger flight 92 extends in close proximity to the directional transition region 41, a variation may be formed in an auger pitch 43. That is, for example, there may be a change in axial distance difference between adjacent corresponding portions of auger 92 having the same orientation with respect to shaft 95 of second conveyor segment 40. Stated another way, the spacing between adjacent flights of the auger may vary from each other. In a further embodiment in which at least a portion of an auger pitch 43 extends into directional transition region 41, a variation may be formed in auger pitch 43 as discussed above. It is to be understood that in different embodiments, the variation of auger pitch may result in an increasing auger pitch, a decreasing auger pitch, or a combination thereof.

It is to be understood that while first conveyor segment 36 and second conveyor segment 40 represent exemplary embodiments in the figures, each conveyor segment 36, 40 are not intended to be so limiting. That is, substantially vertical, as in substantially vertical unloader conveyor or auger or first conveyor segment 36 can significantly deviate from a vertical axis, such that first conveyor segment 36 can define virtually any angular orientation. Similarly, substantially horizontal, as in substantially horizontal unloader conveyor or auger or second conveyor segment 40 can significantly deviate from a horizontal axis, such the second conveyor segment 40 can define virtually any angular orientation. In other words, first conveyor segment 36 and second conveyor segment 40 may have virtually any angular orientation with respect to each other, only limited by the magnitude of the directional transition between the unloader conveyor and practical application of their use for the conveyance of grain with an agricultural device.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An agricultural device for unloading of grain comprising:
    an unloader conveyor including a first enclosed and upwardly and substantially vertically extending housing having an inlet end including an opening for receiving grain, and a second enclosed and substantially horizontally oriented housing having an opposite outlet end including a discharge opening through which the grain can be discharged;
    an unloader conveyor element including a first unloader conveyor segment in the first enclosed housing and a second unloader conveyor segment in the second enclosed housing, the unloader conveyor element extending through the first enclosed housing and the second enclosed housing, the unloader conveyor element positioned between the inlet end and the opposite outlet end, to convey grain through the first enclosed housing and the second enclosed housing;
    a directional transition region positioned between the first unloader conveyor segment and the second unloader conveyor segment; wherein at least a portion of the second enclosed housing located substantially near the directional transition region includes a region that has reduced internal cross-sectional area relative to an outlet of the directional transition region, and wherein at least a portion of the region of reduced cross-sectional area defines a conic section substantially near the directional transition region at an opposite end of the second housing from the outlet end of the second housing, wherein at least a portion of the second unloader conveyor segment includes an auger having an axis of rotation and extending from said second housing at least partially into said directional transition region, said auger having flights with an outer periphery at a constant radius in said directional transition region so that the walls of said conic section diverge from the periphery of said auger flights toward a upstream direction, said conic section being substantially coaxial with the axis of said auger in said second and substantially horizontally oriented housing.

2. The device of claim 1, wherein the region having reduced cross-sectional area is substantially continuous.

3. The device of claim 1, wherein the directional transition region at least partially includes a portion having reduced cross-sectional area.

4. The device of claim 1, wherein at least a portion of the region of reduced cross-sectional area defines a curved profile.

5. The device of claim 1, wherein up to about one flight of the auger extends into the directional transition region.

6. The device of claim 1, wherein at least a portion of a flight of the auger extending in close proximity to or partially into the directional transition region has a variation formed in a pitch of the auger.

7. The device of claim 6, wherein the variation is an increased auger pitch.

8. The device of claim 6, wherein the variation is a decreased auger pitch.

9. The device of claim 1, wherein the agricultural device is a combine.

10. The device of claim 1, wherein the agricultural device is a vessel configured to contain grain therein.

* * * * *